United States Patent Office 3,501,459
Patented Mar. 17, 1970

3,501,459
NEW 5H-DIBENZ[B,F]AZEPINE DERIVATIVES
Walter Schindler, Riehen, and Hans Blattner, Basel, Switzerland, assignors to Geigy Chemical Corporation, Ardsley, N.Y., a corporation of New York
No Drawing. Continuation-in-part of application Ser. No. 399,120, Aug. 25, 1964. This application July 11, 1966, Ser. No. 564,004
Int. Cl. C07d 41/08, 57/00; A61k 27/00
U.S. Cl. 260—239                    39 Claims

ABSTRACT OF THE DISCLOSURE 10-aminoalkyl-5H-dibenz[b,f]azepines and the corresponding 10,11-dihydro compounds, optionally bearing an alkyl substituent in the 5-position, possess pharmacological properties, e.g., they are antidepressants.

CROSS REFERENCE

This application is a continuation-in-part of our pending patent application Ser. No. 399,120 filed Aug. 25, 1964, now abandoned, as a division of co-pending patent application Ser. No. 242,719, filed Dec. 6, 1962, now abandoned.

The present invention relates to new therapeutically valuable derivatives of 5H-dibenz[b,f]azepine and 10,11-dihydro-5H-dibenz[b,f]azepine which are characterized by possessing substituents at the carbon atoms in 10- and or 11-position of the azepine ring which substituents are, A radical of the formula —Z—Am wherein Z is a straight-chain or branched-chain alkylene residue with maximally 6 carbon atoms, and preferably 2 to 6 carbon atoms, of which at least one is located between the carbon atom in 10- or 11-position and Am, and Am is a monoalkylamino or dialkylamino, monoalkenylamino or dialkenylamino radical, in which alkyl has maximally 4 carbon atoms and alkenyl 3 to 4 carbon atoms, or optionally lower alkyl substituted 1-pyrrolidinyl, 1-piperidino, 4-morpholino, 4-lower alkyl-1-piperazinyl, 4-(hydroxy-lower alkyl)-1-piperazinyl, 4-(acyloxy-lower alkyl)-1-piperazinyl or N-methyl-pyrrolidyl, N-methyl-piperidyl and N-methyl-hexahydroazepinyl, And to processes for making these novel compounds.

The new compounds obtainable for the first time by the process according to this invention, may also possess a lower alkyl group at the nitrogen atom in 5-position of the azepine nucleus.

The preparation of the above-discussed novel compounds is not possible by the same methods which can be used, with varying success, for the introduction of the above-listed substituents into positions other than 10 and 11 at the 5H-dibenz[b,f]azepine or the 10,11-dihydro-5H-dibenz[b,f]azepine molecule. Thus alkyl radicals other than methyl can be successfully introduced into 10,11-dihydro compounds by the Friedel-Crafts method, or alkyl including methyl by the Vilsmeier reaction, via the aldehyde group, or by similar conventional substitution reactions; these substitutions will take place at one or both of the aromatic benzene rings of the 10,11-dihydro-5H-dibenz[b,f]azepine molecule, or, by the conventional alkylation reactions etc. for secondary amines, at the nitrogen atom in the 5-position.

Attempts made by us to use the Vilsmeier reaction for the substitution of H by —CHO into the heterocyclic ring of 5H-dibenz[b,f]azepine, i.e. the 10-unsaturated series, for the purpose of eventually introducing alkyl substituents, have failed; the unaffected starting material as well as a resinous, intractable residue were obtained; similarly unsatisfactory results are obtained with the Friedel-Crafts reaction which leaves the starting 5H-dibenz[b,f]azepine unreacted.

It has now been found that, surprisingly, compounds of the 5H-dibenz[b,f]azepine and 10,11-dihydro-5H-dibenz[b,f]azepine series, which contain a substituent as defined above in 10-position or 11-position, can be obtained by processes in accordance with the present invention which are described further below.

One aspect of this invention concerns new azepine derivatives of the general formulas

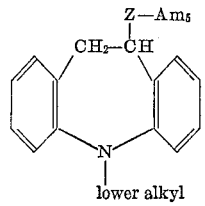

(XXI)

and

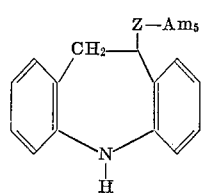

(XXIa)

wherein

Z represents a straight or branched chain alkylene radical having 1 to 6 carbon atoms, and $Am_5$ represents a dialkylamino group the alkyl radicals of which have each 1 to 4 carbon atoms and both of which can be bound to each other directly or by way of an oxygen atom or a lower alkylimino group, when each alkyl has 2 or 3 carbon atoms.

As illustrated in Flowsheet I below, the compounds of the general Formula XXI are produced by first condensing, with the aid of an alkaline condensing agent, a compound of the general formula

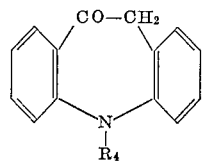

(VII)

wherein $R_4$ represents lower alkyl, with a reactive ester of the general formula $$Q—Z—Am_5 \qquad (XXII)$$

wherein Q represents chlorine, bromine, iodine, mesyloxy or tosyloxy, and $Am_5$ and Z have the meanings given above, to obtain compounds of the formula

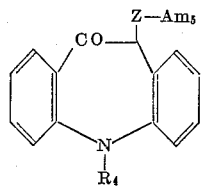

(XXIII)

wherein $R_4$, Z and $Am_5$ have the above-given meanings.

Suitable alkaline condensing agents are, in particular, sodium amide, lithium amide, potassium amide, sodium hydride, butyl lithium, phenyl lithium, lithium hydride or sodium hydride. The reaction is completed advantageously at elevated temperature, preferably 60 to 120° C. in the presence of an inert aromatic hydrocarbon solvent such as benzene, toluene or xylene or lower alkyl ether such as dioxan. Also, for example, potassium carbonate in a suitable alkanone solvent such as acetone, can be used as condensing agent.

The preparation of compounds of the Formula VII is described with reference to the representative wherein R is methyl, in Example 1, infra.

Examples of such starting materials suitable for this process aspect of the invention are, for instance, 5-methyl-, or 5-ethyl-10,11-dihydro-5H-dibenz[b,f]azepine-10-one.

The compounds of Formula XXXI–A which correspond to those of Formulas XXI and XXIa in which $Am_5$ is di-lower alkyl-amino, and $R_7$ is either hydrogen or lower alkyl, are converted to the corresponding 10-mono-lower alkyl-amino alkylene analogs of Formula XI–C by heating to about 50° to 60° C. with chloroformic acid lower alkyl, are converted to the corresponding 10-mono-lower alkoxy carbonyl-N-lower alkyl-amino-alkylene analog of Formula XXI–B which is then decarboxylated with alkali metal hydroxide in alcoholic, especially glycollic solution at about 150°–180° C.

As reactive esters of compounds of the general Formula XXII, the halides in particular are used and also, e.g. p-toluene sulfonic acid ester, 2,4-dinitrobenzene sulfonic acid ester and methane sulfonic acid ester. As examples can be named: β-dimethylamino-ethyl chloride, β-methylethyl-amino-ethyl chloride, β-diethylamino-ethyl chloride, β-(di-n-butylamino)-ethyl chloride, β-di-methylamino-propyl chloride, γ-dimethylamino-propyl chloride, γ-(methylisopropylamino)-propyl chloride, γ-diethylamino-propyl chloride, γ-dimethylamino-butyl chloride, γ-dimethyl-amino-β-methyl-propyl chloride, γ-dimethylamino-butyl chloride, γ - (N-methylbenzylamino)-propyl chloride, γ-(N-ethylbenzylamino) propyl chloride, β-(1-pyrrolidinyl)-ethyl chloride, β-piperidino-ethyl-ethyl chloride, γ-(1-pyrrolidinyl)-propyl chloride, γ-piperidino-propyl chloride, γ-hexamethyleneimino-propyl chloride, γ-piperidino-β-methyl-propyl chloride, β-(4-morpholinyl)-ethyl chloride, γ-(4-morpholinyl)-propyl chloride, β-(4-methyl-1-piperazinyl) - ethyl chloride, γ-4-(methyl-1-piperazinyl)-propyl chloride, β - (N-carbomethoxy-ethylamino)-ethyl chloride, γ - (N-carbomethoxy - methylamino) - propyl chloride and γ - (N - carbomethoxy - ethylamino) - propyl chloride as well as the corresponding bromides and p-toluene sulfonic acid esters.

The new compounds of general Formula XII form salts, some of which are water soluble, with inorganic or organic acids such as hydrochloric acid, hydrobromic acid, sulfuric acid, phosphoric acid, methane sulfonic acid, ethane disulfonic acid, β-hydroxyethane sulfonic acid, acetic acid, succinic acid, fumaric acid, maleic acid, malic acid, tartaric acid, citric acid, benzoic acid, salicylic acid and mandelic acid.

The intermediate compounds of Formula XXIII can be isolated and purified from the reactive mixture by the conventional methods used for such purposes in the case of organic basis; those in which $R_4$ is alkyl have, apart from being intermediates in this process, additional utility in the pharmaceutical field, described further below.

In the next-following step of this aspect of the invention, the 10-oxo function of the compounds of Formula XXIII is reduced, preferably catalytically, to a methylene group, thereby obtaining compounds of the formula XXI, when $R_4$ in the starting compound VII is lower alkyl.

The catalytic hydrogenation step is carried out advantageously at elevated temperatures and pressures, namely about 150 to 220° C. and 100 to 200 atmospheres, and preferably at 180 to 200° C. and about 150 atmospheres, and can be carried out directly with the crude reaction product resulting from the proceeding step preferably in dioxan as the solvent. As catalyst, copper chromite can be used, preferably on a suitable carrier such as barium carbonate.

Alternatively, the compounds of Formula XXI can be converted to those of Formula XXIa by acid hydrolysis, preferably using concentrated hydrohalic acid such as hydrochloric and preferably 48%-hydrobromic acid, at reflux temperature.

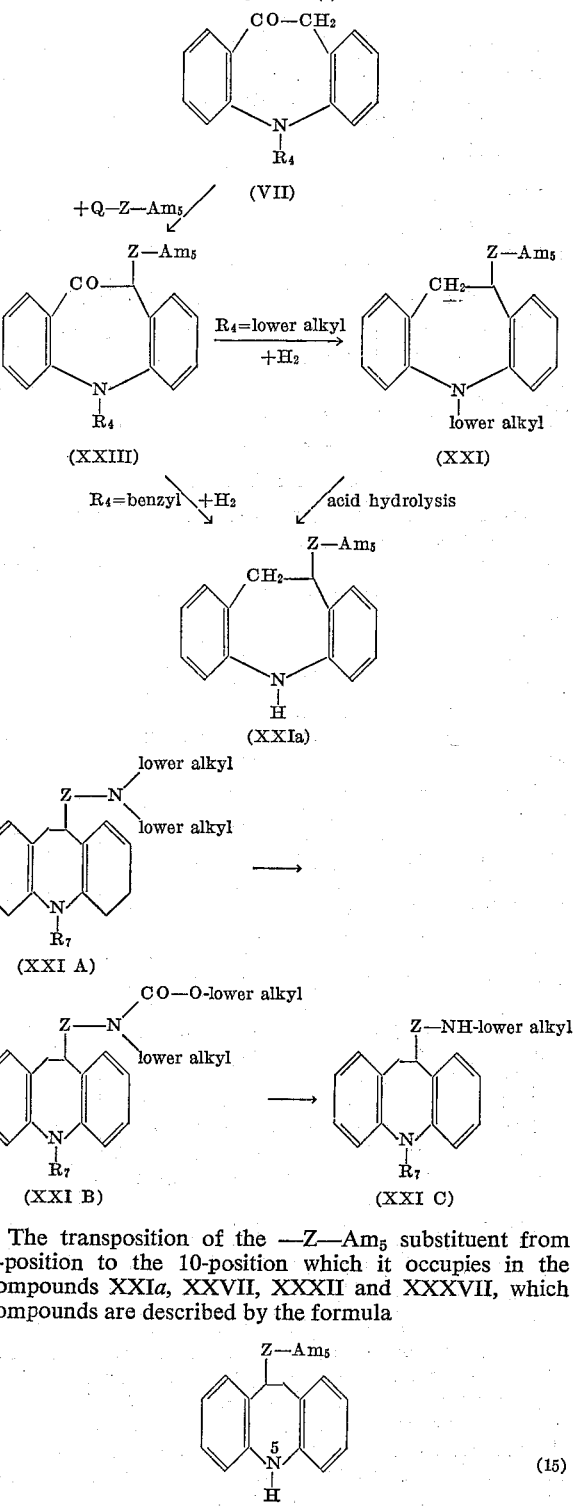

Flowsheet (I)

The transposition of the —Z—$Am_5$ substituent from 5-position to the 10-position which it occupies in the compounds XXIa, XXVII, XXXII and XXXVII, which compounds are described by the formula

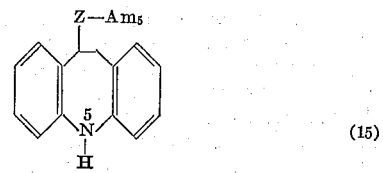

(15)

wherein Z has the above given meaning and is preferably ethylene or n-propylene, and $Am_5$ is either —N(lower alkyl)$_2$, —NH(lower alkyl), 1-pyrrolidyl, 1-piperidyl, 4-lower alkyl-1-piperazinyl or 4-(hydroxy-lower alkyl)-1-piperazinyl, leads to a novel unexpected pharmacodynamic spectrum in which the anticholinergic and antihistaminic components are eliminated, the latter component especially for those compounds in which Z contains more than two directly enchained carbon atoms, while the reserpine-antagonistic and anticonvulsant components as well as the anesthesia potentiating effects are preserved, where the same have been present in the 10,11-unsubstituted isomers.

The absence of significant anticholinergic effects in the pharmacodynamic specturm of the novel compounds of Formula 15, and in particular the simultaneous absence of antihistaminic activity, is an indication that undesirable vegetative, peripheral side effects such as dryness of the mouth or affection of eyes and/or stomach, are substantially reduced or even completely eliminated. These compounds of Formula 15 are therefore characterized by a purer reserpine-antagonistic effect, or, in the case of those compounds in which Z contains less than 3, preferably 2, directly enchained bridge carbon atoms, the combination of reserpine-antaginistic and antihistaminic effects makes the compounds useful for the treatment of such afflictions in which both depression and allergy appear combined, e.g., in cases of allergy of senility accompanied by depression. Remarkably, in 5-acetyl derivatives of compounds of Formula 15, particularly when Z is ethylene and $Am_5$ is dimethylamino, reserpine-antagonistic activity is preserved.

Comparing now the 5-lower alkyl and 5-benzyl analogs of the compounds of Formula 15 and those of the corresponding isomeric structure, namely the lower alkyl or benzyl group in 10-position and the —Z—$Am_5$ radical in 5-position.

It has been found that the pharamacodynamic spectra of those compounds are similar to the extent that they contain anticholinergic, reserpine-antagonistic and musculotropic properties, but that they differ in that those of Formula 16 below also contain antihistaminic and anticonvulsive components. They are described by the formula

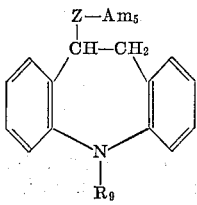

(16)

wherein $R_9$ is alkyl of from 1 to 3 carbon atoms, and Z and $Am_5$ have the above given meanings.

The compounds of Formula XXIII in which $R_4$ is methyl, and in particular those in which —Z—$Am_5$ is di-lower alkylaminoethylene and 4-methyl-piperazinyl-alkylene and Z has preferably from 2 to 4 carbon atoms, have powerful serotonin- and reserpine-antagonistic properties and also potentiating effects on anesthetics, while being free from anticholinergic and free from antihistaminic activities. They are, therefore, useful in the treatment of gastric ulcers, of the effects of certain neoplasms (argentaffinomas), and in the treatment of mental disorders due to serotonin overbalance.

Their pharmacodynamic spectra are thus dissimilar from those of the dibenz-azepine 10-ones having the corresponding —Z—$Am_5$ grouping in 5-position, which are described in U.S. Patent No. 3,144,442 issued on Aug. 11, 1964, as being powerful antihistaminics and are essentially free from serotonin- and reserpine-antagonistic, from sedative and anesthesia-potentiating properties.

The compounds of the formula

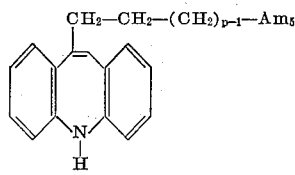

(17)

in which $Am_5$ and $p$ have the aforesaid meanings, have pharmacological spectra closely resembling those of the compounds of Formula 15 supra. The preparation of these compounds will be described in the text following Example 3.

The following examples further illustrate the production of the new compounds according to this aspect of the invention. The temperatures are in degrees centigrade.

EXAMPLE 1

(a) 22.3 grams (g.) of 5-methyl-5H-dibenz[b,f]azepine-10(11H)-one are dissolved in 250 ml. of abs. benzene and a suspension of 4.0 g. of sodium amide in toluene is added. The mixture is refluxed for 3 hours while introducing nitrogen, it is then cooled to 50°, 13.5 g. of freshly distilled γ-dimethyl-amino-propyl chloride are added and then the whole is refluxed for 20 hours. The reaction mixture is cooled and water is added. The benzene phase is separated and extracted three times with 1 N hydrochloric acid. The combined acid extracts are made alkaline and then extracted with ether. The ether solution is dried and concentrated. 16 g. of the oil which remains are heated with 48 ml. of 2 N hydrochloric acid for 5 to 10 minutes at 80° and then the hydrochloric acid solution is cooled with ice. The separated crystals of 5 - methyl-dibenz[b,f]azepine-10(11H) - one, which have been liberated by hydrolysis from basic enol ether formed as side product, are filtered off and the hydrochloric acid filtrate is made alkaline and extracted with ether. The ether solution is dried, ethanolic hydrochloric acid is added whereupon the hydrochloride of 5-methyl-11 - (γ-dimethyl-amino-propyl) - 5H - dibenz[b,f]azepine-10(11H)-one crystallizes out. M.P. 236–238°.

The following compounds, for example, can be produced in an analogous manner:

5-methyl-11-(β-dimethylamino-ethyl)-5H-dibenz[b,f]azepine-10(11H)-one;

5-methyl-11-(γ-dimethylamino-β-methyl-propyl)-5H-dibenz[b,f]azepine-10(11H)-one;

5-methyl-11-[β-(1-pyrrolidyl)-ethyl]-5H-dibenz[b,f]azepine-10(11H)-one hydrochloride;

5-methyl-11-(γ-piperidino-propyl)-5H-dibenz[b,f]azepine-10(11H)-one;

5-methyl-11-[γ-(4'-methyl-1'-piperazinyl)-propyl]-5H-dibenz[b,f]azepine-10(11H)-one;

5-ethyl-11-(β-dimethylamino-propyl)-5H-dibenz[b,f]azepine-10(11H)-one;

5-ethyl-11-[γ-(4'-methyl-1'-piperazinyl)-propyl]-5H-dibenz[b,f]azepine-10(11H)-one;

5-isopropyl-11-(γ-dimethylamino-propyl)-5H-dibenz[b,f]azepine-10(11H)-one;

(b) 100 g. of 5-methyl-11-(γ-dimethylamino-propyl)-5H - dibenz[b,f] azepine - 10(11H)-one are dissolved in 1000 ml. of dioxan and hydrogenated over 100 g. copper chromite/barium carbonate catalyst at 180 to 200° and 150 atm. pressure. After cooling and removal of the catalyst by filtration, the solvent is evaporated in vacuo and the residue distilled giving 5-methyl-10-(γ-dimethyl-amino-propyl) - 10,11-dihydro-5H-dibenz[b,f]azepine of B.P. 172–6°/0.008 Torr.

In an analogous manner 5-methyl-11-(β-dimethylamino-ethyl)-5H-dibenz[b,f]azepine-10(11H)-one gives 5-methyl-10-(β-dimethyl-amino-ethyl)-10,11-dihydro - 5H-dibenz[b,f]azepine, and 5-methyl-11-[β-(1-pyrrolidyl)-ethyl] - 5H - dibenz[b,f]azepine-10(11H)-one gives 5-methyl-10-[β-(1-pyrrolidyl)-ethyl]-10,11-dihydro - 5H-dibenz[b,f]azepine.

(c) 10 g. of 5-methyl-10-(γ-dimethylamino-propyl)-10,11-dihydro-5H-dibenz[b,f]azepine are boiled under reflux for two hours with 35 ml. hydrobromic acid (48%). The mixture is then concentrated in vacuo and the residue dissolved in water. The solution is made alkaline and extracted with ether, the ether extract separated, dried and evaporated to dryness. The residue is distilled in a high vacuum, giving 10 - (γ-dimethylamino-propyl)-10,11-dihydro-5H-dibenz[b,f]azepine of B.P. 160° 0.004 Torr. The neutral fumarate of this base has M.P. 276–278°.

In an analogous manner 5-methyl-10-(β-dimethylamino-propyl)-10,11-dihydro-5H-dibenz[b,f]azepine of B.P. 160°/0.004 Torr. The neutral fumarate of this base has M.P. 276–278°.

In an analogous manner 5-methyl-10-(β-dimethylamino-ethyl)-10,11-dihydro-5H-dibenz[b,f]azepine gives 10-(β - dimethylamino - ethyl) - 10,11 - dihydro - 5H - dibenz[b,f]azepine.

5 - methyl - 5H - dibenz[b,f]azepine-10(11H)-one, the starting compound in the present example, is prepared as follows:

(i) 407 parts of bromine in 250 parts by volume of chloroform are dropped into a solution of 600 parts of 5 - acetyl - 5H - dibenz[b,f]azepine in 1200 parts by volume of chloroform at 5–10° with stirring. The decolorized solution is then cooled to −10° while stirring, when crystallization of the 5-acetyl-10,11-dibromo-10,11-dihydro - 5H - dibenz[b,f]azepine takes place. It is filtered off by suction and dried in vacuo. M.P. 136–138°.

(ii) 125 parts of 5-acetyl-10,11-dibromo-10,11-dihydro-5H-dibenz[b,f]azepine are introduced with vigorous stirring into a solution of 135 parts of sodium in 1000 parts by volume of distilled methanol and the solution is then boiled under reflux for 16 hours. 500 parts by volume of methanol are then distilled off and the reaction solution is boiled under reflux for a further 24 hours. After cooling, 500 parts of water are slowly added, when the crystalline crude product is precipitated. It is filtered off by suction, thoroughly washed with water and dried in vacuo at 60°. 10 - methoxy - 5H-dibenz[b,f]azepine of M.P. 124° is obtained by recrystallization from 350 parts by volume of absolute alcohol.

(iii) 111.5 parts of 10-methoxy-5H-dibenz[b,f]azepine and 95 parts of methyl iodide are dissolved in 500 parts by volume of absolute thiophene-free benzene. A suspension of 26 parts of sodamide in toluene is dropped in at 43–45° over a period of 1½ hours. The reaction mixture is thereupon heated for an hour at 55° and then boiled under reflux for an hour. After cooling, it is treated with water, and the benzene layer is separated and thoroughly washed with water. It is then dried over sodium sulfate and concentrated, when crystallization occurs. The crystals are filtered off by suction and washed with a little cold benzene. The 5-methyl-10-methoxy-5H-dibenz[b,f]azepine obtained melts at 145–146°.

(iv) 116 parts of 5-methyl-10-methoxy-5H-dibenz[b,f]azepine are boiled under reflux for an hour in 500 parts of 2 N hydrochloric acid. After cooling, the precipitated crystals are dissolved in benzene. The benzene solution is washed with water, dried and concentrated, when 5-methyl-5H-dibenz[b,f]azepine-10(11H)-one crystallizes out. It is filtered off by suction and washed with a little benzene. M.P. 104°.

EXAMPLE 2

To 31 g. of ethyl chloroformate there is added dropwise a solution of 20 g. 10-(γ-dimethylamino-propyl)-10,11-dihydro-5H-dibenz[b,f]azepine in 150 ml. of absolute benzene, and the mixture is heated to 50 to 60° for 8 hours. After cooling, water is added and the phases are separated. The benzene phase is extracted twice with 50 ml. 2 N hydrochloric acid, dried and evaporated to dryness. The residue consisting of 10[γ-(N-carbethoxy-methyl-amino)-propyl]-10,11-dihydro-5H-dibenz[b,f]azepine (18 g.) and 5.3 g. potassium hydroxide are dissolved in 100 ml. of ethylene glycol and heated for 18 hours to 160 to 165°. After cooling, the mixture is poured into excess water. The resulting oil is extracted from the aqueous phase with ether, the ether solution is extracted three times with dilute hydrochloric acid, the combined acid extracts are made alkaline, and then extracted with ether. The ether extract is dried, evaporated to dryness, and the residue is distilled in a high vacuum giving 10-(γ-methylamino-propyl)-10,11-dihydro-5H-dibenz[b,f]azepine, B.P. 186°/0.05 torr.

In an analogous manner 5-methyl-10(γ-dimethylamino-propyl)-10,11-dihydro-5H-dibenz[b,f]azepine furnishes 5-methyl - 10 - (γ-methylamino-propyl)-10,11-dihydro-5H-dibenz[b,f]azepine, and 10 - (β - dimethylamino-ethyl)-10,11-dihydro-5H-dibenz[b,f]azepine gives 10-(β-methyl-amino-ethyl)-10,11-dihydro-5H-dibenz[b,f]azepine.

EXAMPLE 3

To a solution of 14 g. of 10-(γ-dimethylamino-propyl)-10,11-dihydro-5H-dibenz[b,f]azepine in 140 ml. absolute benzene is added dropwise 7 g. of acetyl chloride, and the mixture is then refluxed for 16 hours. After cooling, excess saturated sodium carbonate solution is added dropwise to the stirred reaction mixture. The benzene phase is separated, washed with water, dried and evaporated to dryness. The residue is distilled in a high vacuum giving 5 - acetyl - 10 - (γ - dimethylamino - propyl) - 10,11-dihydro - 5H - dibenz[b,f]azepine of B.P. 187°/0.015 torr, $n_D^{21}$ 1.5796.

In an analogous manner, 5-acetyl-10-(β-dimethylamino-ethyl)-10,11-dihydro-5H-dibenz[b,f]azepine is produced from 10 - (β - dimethylamino - ethyl)-10,11-dihydro-5H-dibenz[b,f]azepine.

A further aspect of the invention relates to a new process for the production of 10-substituted - 5H-dibenz [b,f]azepines, which is illustrated in Flowsheet II below, wherein, as well as in the formulas given hereinafter, $Am_5$ is —N(lower alkyl)$_2$, —NH-lower alkyl, 1-pyrrolidyl, 1-piperidyl, 4-lower alkyl-1-piperazinyl or 4-(hydroxy-lower alkyl)-1-piperazinyl.

This process comprises (a) reaction of a compound of the Formula XIIIa, namely

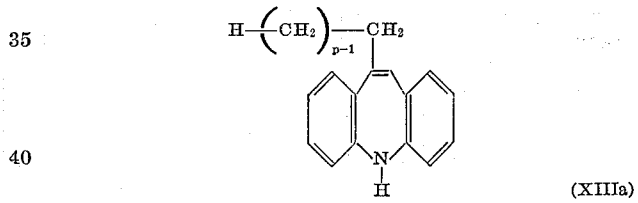

(XIIIa)

wherein, as in all subsequent formulas, $p$ is either 1 or 2 with a lower alkanoic acid, anhydride or halide, such as formic acid, acetic anhydride or acetyl chloride or bromide, by refluxing of the mixture, and in the absence of a solvent, to obtain a compound of the formula

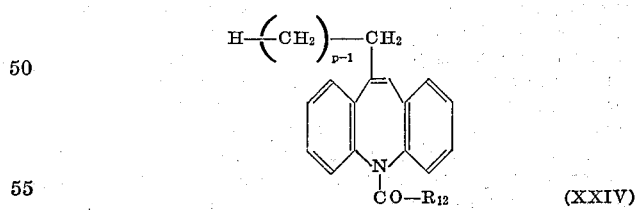

(XXIV)

wherein $R_{12}$ is either hydrogen or methyl, and then (b) brominating the resulting reaction product with bromo-succinimide and irradiation with light, preferably ultraviolet light, in a halogenated hydrocarbon solvent, preferably a fully chlorinated alkane with preferably 1 to 2 carbon atoms, in particular carbon tetrachloride, at reflux temperature to obtain a compound of the formula

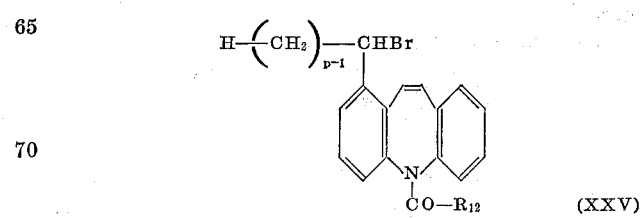

(XXV)

This compound can be further treated as a crude product or it can be isolated and purified.

From the latter compound (XXV), which is an important intermediate in this process aspect of this invention, there are produced compounds of the formula

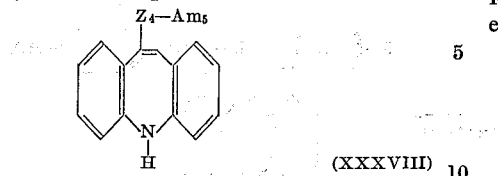

(XXXVIII)

wherein $Z_4$ is either methylene, ethylene, n-propylene or monomethyl-substituted analogs thereof. Classes of compounds each with one of the three aforesaid $Z_4$ bridges, are distinguished from one another chemically by the manner in which the same can be produced, and pharmacologically by clear differences in their pharmacodynamic spectra, and correspondingly different pharmaceutical utilities.

From the isomers having the —$Z_4$—$Am_5$ substituent at the nitrogen atom in 5-position, each of the several classes of compounds is distinguished by a single outstanding pharmacological property, as contrasted to the combination of several such properties forming the pharmacodynamic spectra characteristic of the 5-isomers. Thereby is achieved a highly desirable separation of properties which were hitherto joined in the aforesaid pharmacological spectra of the 5-isomers, which finds its practical result in the avoidance of the several vegetative side effects which must always be taken into the bargain with the isomeric compounds having —$Z_4$—$Am_5$ in 5-position.

This invention aspect also comprises dibenzazepines of the formula

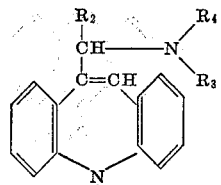

wherein (I)

$R_1$ represents a lower alkyl radical and preferably methyl, in lieu of hydrogen in Formula XXVII, $R_2$ represents hydrogen or the methyl radical, each of $R_3$ and $R_4$ represents hydrogen or a lower alkyl radical, or $NR_3(R_4)$ represents a saturated heterocyclic radical of 5–7 ring members having, optionally, the imino group, a lower alkyl-imino, hydroxy-lower alkyl-imino or lower alkanoyloxy-lower alkylimino group as ring member, and their addition salts with inorganic or organic acids.

The compounds according to this invention aspect have valuable peripheral pharmacological properties and also act on the central nervous system. On oral, rectal or parenteral administration, they have a pronounced anticholinergic action as well as anaesthesia-potentiating action; they inhibit monosynaptic and polysynaptic reflexes, and they antagonize medicaments which, as, e.g. tetrabenzazine, have a depressant action on the central nervous system. They also have sedative, anti-convulsive, histaminolytic and norepinephrine-potentiating activities.

The new compounds as useful as spasmolytics in the treatment of peripheral spasms, and are thereby distinguished from the compounds of Formula XXVII by having a methyl group in lieu of a hydrogen atom at the nitrogen atom in 5-position.

In the compounds of Formula I, $R_1$, $R_3$ and $R_4$, for example, as lower alkyl radicals represent the methyl, ethyl, propyl, isopropyl, butyl, isobutyl, sec-butyl and the t-butyl group, or $R_3$ and $R_4$ together with the adjacent nitrogen form, as heterocyclic radicals, the 1-pyrrolidinyl, piperidino, hexahydro-1H-azepin-1-yl, 1-piperazinyl, 4 - methyl - 1-piperazinyl, 4-(2 - hydroxyethyl)-1-piperazinyl, 4-(2 - acetoxyethyl) - 1-piperazinyl, 4-(2-pivaloyloxyethyl) - 1-piperazinyl, hexahydro - 1H-1,4-diazepin - 1-yl, 4-methyl - hexahydro - 1H-1,4-diazepin-1-yl or the 4-(2-hydroxyethyl)-hexahydro-1H-1,4-diazepin-1-yl radical.

FLOWSHEET (II)

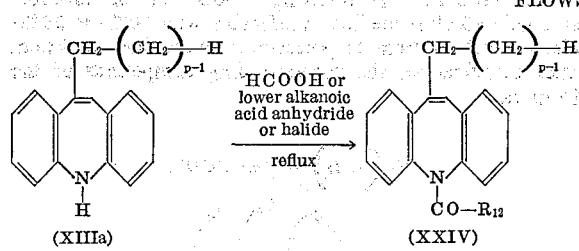

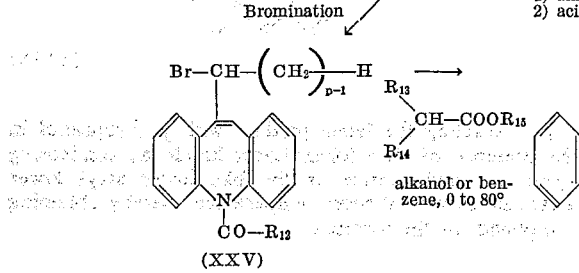

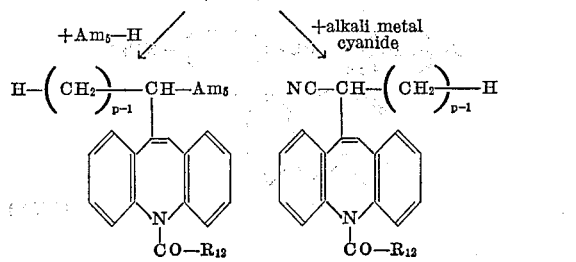

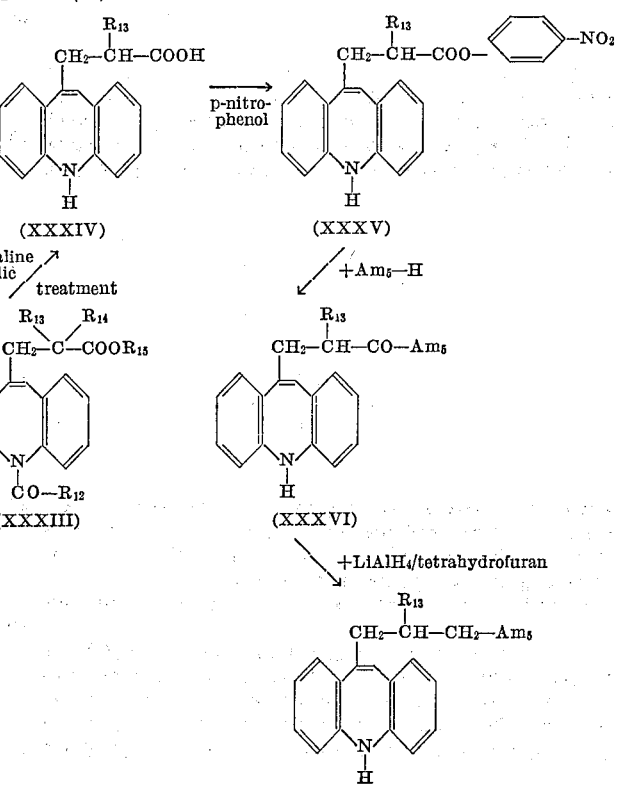

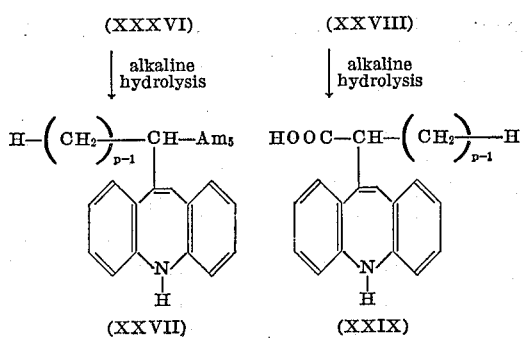

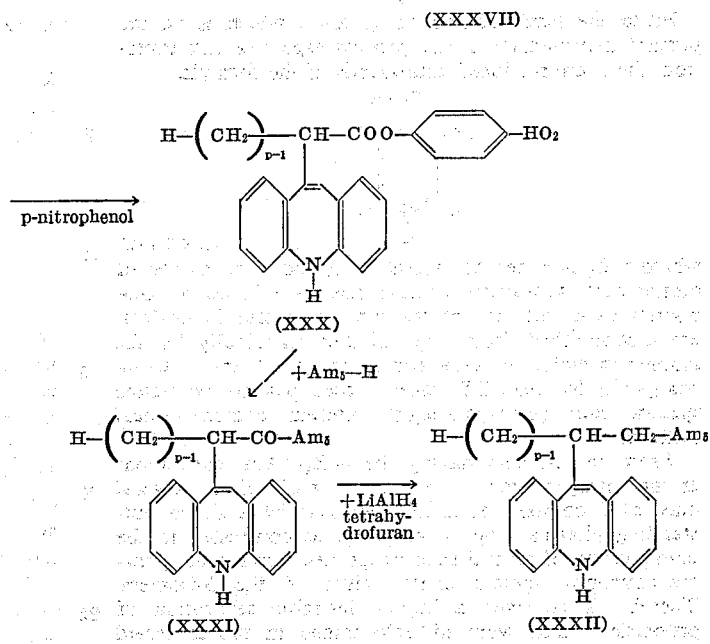

Firstly, intermediates of Formula XXV can be converted by (a) Reaction with compounds of the formula H—$Am_5$ preferably in a lower alkanol, such as ethanol, as inert solvent, and at room temperature or elevated temperature, preferably not exceeding 80° C., to obtain compounds of the formula

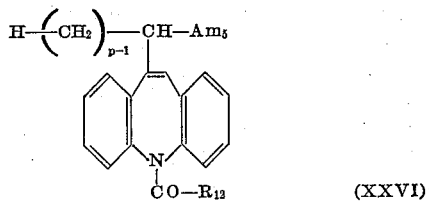

and then (b) Hydrolizing the resulting crude products in an alkanol, especially glycol- or a glycol-monoether-type inert solvent, such as monoalkyl ethers of ethylene glycol or diethylene-glycol, with potassium or sodium hydroxide and refluxing, so as to obtain compounds of the formula

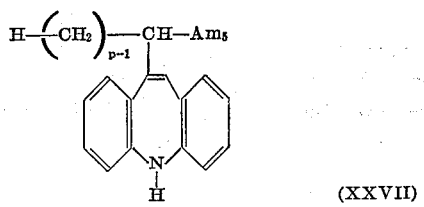

which are recovered by evaporation of the solvent, preferably under reduced pressure, and extraction or dilution of the residue or concentrate with water, filtering off or extracting the precipitate, and recrystallization.

Secondly, intermediates of Formula XXV can be converted by (a) Reaction with an alkali metal cyanide (NaCN or KCN) in alkanolic (ethanolic) medium with a water content not exceeding 25% by weight and preferably not exceeding 10% by weight of the medium, the cyanide being added and maintaining a reaction temperature of about 20° to 80° and preferably 40° C., to compounds of the formula

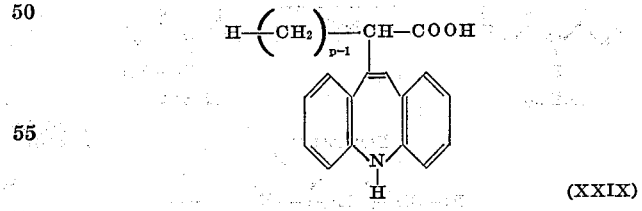

in which, as in the subsequent formulas, $R_{12}$ and $p$ have the same meanings as in Formula XXV;

(b) Refluxing the resulting product in an aqueous-alkanolic alkaline medium, preferably with 10%- to 20%- alkali metal (sodium or potassium) hydroxide, to obtain, after acidification, the corresponding compounds of the formula

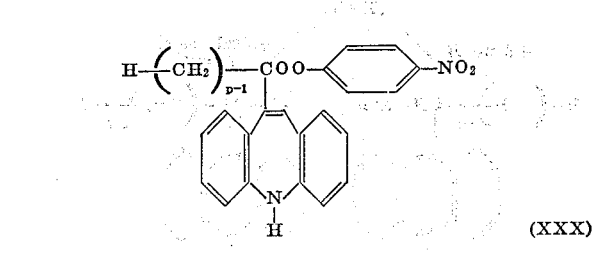

(c) Reacting the latter product with p-nitrophenol in the presence of dicyclohexylcarbodimide as condensing agent, in ethyl acetate or the like lower alkyl lower alkanoate solvent at room temperature, thereby obtaining compounds of the formula (d) Reaction of the resulting product with a compound of the formula H—Am₅ in an inert solvent such as benzene or partially halogenated alkane with one to two carbon atoms as solvent, preferably chloroform, wherein the amine H—Am₅ is added to the compound XXX-solvent mixture at a temperature of about 0° to 15° C., and the temperature is then raised to below the boiling point of the solvent, preferably to about 40° to 45° C., whereby compounds of the formula

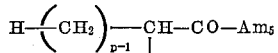
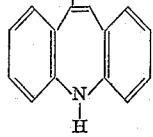
(XXXI)

are obtained, which are then (e) Refluxed with lithium aluminum hydride in an ether solvent, preferably tetrahydrofuran, to obtain final products of the formula

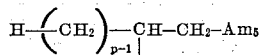
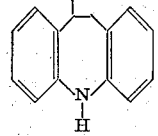
(XXXII)

excess lithium aluminum hydride is then decomposed by addition of water and alkali metal hydroxide (NaOH), the precipitate is filtered off, and the solvent is evaporated from the filtrate, whereupon the residue is taken up and recrystallized from ether.

Thirdly, intermediates of the Formula XXV can be converted by (a) Reaction with a compound of the formula

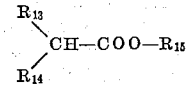

wherein $R_{13}$ is either hydrogen, methyl or ethyl,
$R_{14}$ is either —CN or —COO—$R_{16}$, and each of $R_{15}$ and $R_{16}$ is lower alkyl, preferably ethyl especially in the form of their sodio derivatives, in an alkanol, in particular ethanol, or in benzene, the sodio ester being added preferably at about 0° C., and the resulting mixture then being stirred for several hours at room temperature, whereby compounds of the formula

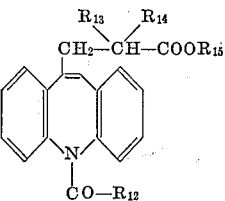
(XXXIII)

are obtained. This reaction is carried out, for instance, with ethyl cyanoacetate, ethyl-methylcyanoacetate, dimethyl malonate, diethyl malonate, diethyl methylmalonate, ethyl acetoacetate or ethyl C-methylacetoacetate; preferably diethyl methylmalonate is used and the resulting compounds of Formula XXXIII in which $R_1$ is —COO—$R_{16}$ and both $R_{15}$ and $R_{16}$ are ethyl, are preferably further treated by (b) Hydrolizing the same first with dilute aqueous or aqueous-alkanoic mineral acid, preferably 5% to 10%-hydrochloric acid at reflux, neutralizing, evaporating under reduced pressure, and further hydrolizing the resulting residue with alkali metal hydroxide, preferable 20%-potassium hydroxide, in alkanol, preferably ethylene glycol at reflux, whereby compounds of the formula

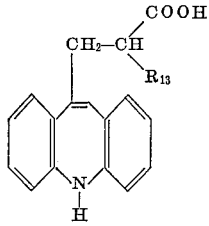
(XXXIV)

are obtained. These are then converted further by (c) Reaction with p-nitrophenol, under the conditions described above in the preparation of compounds of Formula XXX, to compounds of the formula

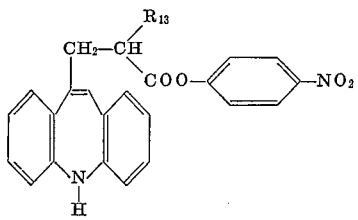
(XXXV)

and the latter by (d) Reaction with a compound of the formula H—Am₁, under the conditions described above in the preparation of compounds of the Formula XXXI, to compounds of the formula

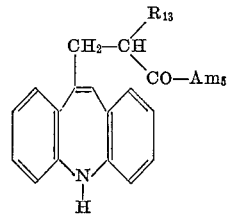
(XXXVI)

(e) By refluxing with lithium aluminum hydride under the conditions described in the preparation of compound XXXII above, the compounds of Formula XXXVI are converted to the final products of formula

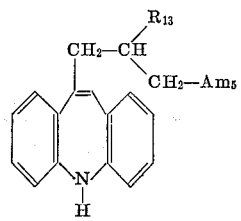
(XXXVII)

which are then recovered in the manner described above.

Compounds of the Formula XXVII have no corresponding 5-substituted isomers of sufficient stability to be of practical use as pharmaceuticals. The novel dibenzazepine derivatives of Formula XXVII are distinguished by a pharmacodynamic spectrum which comprises in the first line antihistaminic and further sedative (tranquilizing), anti-convulsive and anesthesia potentiating components. Those compounds of Formula XXVII in which (1) Am₅ is di(lower alkyl) amino possess pharmacodynamic spectra with antihistaminic and tranquilizing activity;

(2) In those compounds of Formula XXVII in which Am₅ is 1-pyrrolidyl or 1- piperidyl, the antihistaminic component is accompanied by a reduced sedative effect and further by an additional reserpine-antagonistic component;

(3) Finally when Am₅ is a piperazine radical, the antihistaminic component is practically free from a sedative side component. These pharmacodynamic spectra make all three types of compounds comprised by Formula XXVII useful in the treatment of allergic conditions such as hayfever, asthma, rhinitis, allergic skin conditions and, particularly the first-mentioned type of these compounds, for the additional alleviation of tension and anxiety, and the second-mentioned type for the alleviation of allergic condition accompanied by depression, such as may occur in senile pruritus.

The compounds of general Formula I are produced according to the invention by reacting a reactive ester of a hydroxyl compound of the general formula

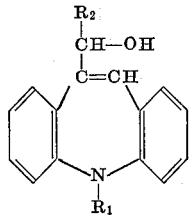

II wherein $R_1$ and $R_2$ have the meanings given in Formula I, with a compound of the general Formula III

(III)

wherein $R_3$ and $R_4$ or $NR_3(R_4)$ have the meanings given in Formula I, or with a N-acyl derivative of piperazine or hexahydro-1H-1,4-diazepine, or with a metal compound of an N-acyl derivative of a low alkylamine, if necessary subjecting the reaction product to hydrolysis to remove any acyl radical bound to a nitrogen atom of the side chain, if desired, treating a compound of general Formula I having the imino group as ring member with a low alkylene oxide, with a reactive monoester of a low alkane diol or with a reactive ester of a low alkanoyloxyalkanol, if desired, acylating a compound of the general Formula I which contains a low hydroxyalkylimino group as ring member into one containing a low alkanoyloxyalkylimino group, and, if desired, converting a compound of general Formula I into an addition salt with an inorganic or organic acid.

The halides, particularly the bromides, are used as reactive esters of hydroxyl compounds of general Formula II. Other derivatives of this type are sulphonic acid esters such as tosyl esters or mesyl esters.

Reactions of reactive esters of compounds of the general Formula II with amines of general Formula III are performed, e.g. in inert solvents, whereby an excess of amine can serve as acid binding agent and, optionally, also as sole reaction medium. Suitable inert solvents are, e.g. hydrocarbons such as benzene or toluene, low alkanols such as methanol or ethanol, low alkanones such as acetone or methylethyl ketone, and also water. The reaction is more or less exothermic depending on the meaning of $R_1$, $R_2$, $R_3$ and $R_4$; if necessary, it is completed by heating the reaction mixture. The reactive ester of compounds of general Formula II can be reacted, for example, with dimethylamine, methylethylamine, diethylamine, dipropylamine, dibutylamine, methylamine, ethylamine, propylamine, isopropylamine, sec.butylamine, ammonia, pyrrolidine, piperidine, hexahydro-1H-1,4-diazepine, 1-methyl-piperazine, piperazine-1-ethanol, 1-(2-acetoxyethyl)-piperazine, 1-(2-pivalolyloxyethyl)-piperazine or 1-methyl-hexahydro-1H-1,4-diazepine.

The reaction of a reactive ester of a compound of general Formula II with an N-acyl derivative of piperazine or hexahydro-1H-1,4-diazepine such as e.g. an N-formyl, N-acetyl, N-phenoxycarbonyl or N-phenoxythiocarbonyl derivative or a low N-alkoxycarbonyl or N-alkylthiocarbonyl derivative or with a metal compound of an N-acyl derivative of a low alkylamine such as the sodium compound of a low N-formyl-, N-alkoxycarbonyl- or an N-phenoxycarbonyl-, N-alkoxythiocarbonyl- or an N-phenoxy thiocarbonyl-alkylamine, is performed, e.g. in an inert organic solvent under anhydrous conditions. Suitable solvents are, e.g. hydrocarbons such as benzene or toluene. The piperazine or hexahydro-1H-1,4-diazepine compounds mentioned can be reacted in the presence of an acid binding medium, preferably in the presence of an excess of the original base.

The acyl radical of the reaction product obtained, which radical is bound to a nitrogen atom of the side chain, can subsequently be removed by heating the reaction product with an alkali metal hydroxide such as potassium hydroxide in an organic solvent. Suitable reaction media are, e.g. solvents containing hydroxyl groups such as ethylene glycol or diethylene glycol, their low alkyl ethers or low alkanols such as ethanol. The low alkanols are preferably used in a closed vessel. In addition, the hydrolysis can also be performed by boiling with alkanolic hydrochloric acid.

Low hydroxyalkyl or alkanoyloxyalkyl radicals are introduced into the free imino group of compounds of general Formula I wherein $NR_3(R_4)$ and an imino group form ring members of a heterocyclic radical by treating such compounds, particularly 1-piperazinyl or hexahydro-1H-1,4-diazepin-1-yl compounds with, for example, ethylene oxide, propylene oxide, 2-bromoethanol, 2-(p-tolylsulphonyloxyethanol) or with (2-bromoethyl)-acetate. The reaction is preferably performed in a solvent, to which an acid binding agent is added if the reaction proceeds with removing 1 mol equivalent of acid. Suitable solvents are, e.g. hydrocarbons such as benzene or toluene, low alkanones such as acetone or methylethyl ketone, and suitable acid binding agents are alkali carbonates such as potassium carbonate.

The hydroxyl groups of compounds of general Formula I wherein $NR_3(R_4)$ and a low hydroxyalkylimino group form ring members of a heterocyclic radical, particularly the hydroxyl groups of 4-hydroxyalkyl-1-piperazinyl or 4-hydroxyalkylhexahydro-1H-1,4-diazepin-1-yl compounds, are acylated by heating these, for example, in the anhydride of a low alkanoic acid such as acetic acid, propionic acid, butyric acid or pivalic acid or treating with a corresponding acid halide in a tertiary nitrogen base such as pyridine. Also, the sodium derivatives of such hydroxyalkyl compounds can be reacted with corresponding acid halides.

Starting materials of the general Formula II are, e.g. 10-bromomethyl- or 10-($\alpha$-bromoethyl)-5-alkyl-5H-dibenz[b,f] azepines. Surprisingly, these compounds can be produced, e.g. by bromination with bromosuccinimide, from 10-methyl- or 10-ethyl 5-alkyl-dibenz[b,f]azepines.

According to a second process of the invention to produce the compounds of general Formula I, compounds of the general Formula IV

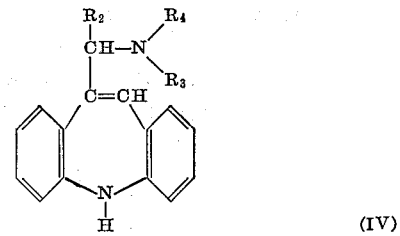

(IV)

wherein $R_2$, $R_3$ and $R_4$ have the meanings given in Formula I, or $[NR_3(R_4)]$ represents a saturated heterocyclic radical having 5–7 ring members with optionally, the imino group, a low alkylimino or alkanoyloxyalkylimino group, are alkylated, preferably in the presence of solvents and basic condensing agents, with reactive esters of alkanols of the general Formula V $$R_1\text{—OH}$$

wherein $R_1$ has the meaning given in Formula I, and, optionally, the compounds obtained are converted into their addition salts with inorganic or organic acids.

Starting material of general Formula IV are described in the literature. Other compounds of this type are produced analogously. As second reaction component, reactive esters of alkanols of general Formula III are used, the radical $R_1$ of which has the meanings given for this radical following Formula I. As reactive esters, for example, halides such as chlorides, bromides or iodides, sulphonic acid esters such as methane sulphonic acid ester, benzene sulphonic acid ester, o- and p-toluene sulphonic acid ester of 2,4-dinitrobenzene sulphonic acid ester as well as sulphuric acid esters such as dimethyl or diethyl sulphate, can be used.

The reaction can take place in the presence or absence of an inert organic solvent. Suitable inert solvents are, e.g. hydrocarbons such as benzene, toluene, xylene, cumol or tetralin, ethereal liquids such as dioxan, alkanones such as acetone or methyl ethyl ketone, carboxylic acid amides such as dimethyl formamide, or sulphoxides such as dimethyl or diethyl sulphoxide. Suitable basic condensing agents are, e.g. alkali metals such as sodium, potassium or lithium, alkali hydroxides such as sodium or potassium hydroxide, alkali carbonates such as potassium carbonate, alkali amides such as sodium, potassium or lithium amide, alkali hydrides such as sodium or lithium hydride, alkali alkanolates such as sodium methylate, sodium ethylate or sodium tert. butylate or alkyl and aryl lithium compounds such as butyl or phenyl lithium.

The compounds of general Formula I obtained by the process according to the invention are then converted, if desired, into their addition salts in the usual way with inorganic and organic acids. For example, the acid desired as salt component or a solution thereof is added to a solution of a compound of general Formula I in an organic solvent. Preferably organic solvents in which the salt formed is difficultly soluble are chosen for the reaction so that the salt can be isolated by filtration. Such solvents are, e.g. methanol, methanol/diethyl ether or ethanol/diethyl ether.

These acid addition salts can be used as medicaments instead of free bases, i.e. salts with those acids the anions of which are pharmaceutically acceptable in the usual dosages. It is also of advantage if the salts to be used as medicaments crystallise well and are not or are only slightly hygroscopic. For example, hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, oxalic acid, succinic acid, fumaric acid, maleic acid, benzoic acid, salicyclic acid, phenyl acetic acid, mandelic acid and embonic acid can be used for salt formation with compounds of the general Formula I.

As mentioned above, the new active substances are administered orally, rectally and parenterally. The daily dosages of the free bases or of pharmaceutically acceptable salts thereof vary between 10 and 800 mg. for adult patients. Suitable dosage units such as dragées (sugar coated tablets), tablets, suppositories or ampoules, preferably contain 5-50 mg. of an active substance according to the invention or of a pharmaceutically acceptable salt thereof. Also corresponding amounts of forms not made up into single dosages such as syrups, aerosols, ointments or powders can be applied.

Dosage units for oral administration preferably contain between 1-90% of a compound of general Formula I or a pharmaceutically acceptable salt thereof as active substance. They are produced by combining the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols (Carbowaxes) of suitable molecular weights to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Examples of dosage units for rectal administration are suppositories which consist of a combination of an active substance or a suitable salt thereof and a neutral fatty foundation, or also gelatine rectal capsules which contain a combination of the active substance or a suitable salt thereof and polyethylene glycols (Carbowaxes) of suitable molecular weight.

Ampoules for parenteral, particularly intramuscular, administration preferably contain a water soluble salt of an active substance in a concentration of, preferably, 0.5-5%, in aqueous solution, optionally together with suitable stabilizing agents and buffer substances.

The following prescriptions further illustrate the production of tablets and dragées:

(a) 250 g. of 5-methyl-10-dimethylaminomethyl-5H-dibenz[b,f]azepine hydrochloride are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighting 100 mg. and containing 25 mg. of active substance. If desired, the tablets can be grooved for better adaptation of the dosage.

(b) A granulate is produced from 250 g. of 5-methyl-10-dimethylaminomethyl - 5H - dibenz[b,f]azepine hydrochloride, 175.90 g. of lactose and the alcoholic solution of 10 g. of stearic acid. After drying, the granulate is mixed with 56.60 g. of colloidal silicium dioxide, 165 g. of talcum, 20 g. of potato starch and 2.50 g. of magnesium stearate and the mixture pressed into 10,000 dragée cores. These are then coated with a concentrated syrup from 502.28 g. of crystallised saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

The following non-limitative examples further illustrate the production of the new compounds according to this aspect of the invention. The temperatures are in degrees centigrade.

EXAMPLE 4

(a) To a solution of 228 g. of 5-acetyl-10-methyl-5H-dibenz[b,f]azepine in 1900 ml. of carbon tetrachloride are added 169 g. of N-bromo succinimide. The mixture is kept in a nitrogen atmosphere and is stirred mechanically. While irradiating with the aid of two 100-watt lamps, the temperature is raised to the boiling point, where it is kept until all N-bromo succinimide is consumed. The process lasts about 90 minutes. Then the mixture is cooled to room temperature, the succinimide is filtered off, and the filtrate is evaporated to dryness in vacuo. The residue consists of 5-acetyl-10-bromomethyl-5H-dibenz[b,f]azepine, M.P. 133–135°, yield 87%.

The 5-acetyl-10-methyl-5H-dibenz[b,f]azepine is prepared by acetylation of 10-methyl-5H-dibenz[b,f]azepine solution in absolute benzene by the dropwise addition of acetyl chloride, followed by refluxing for 16 hours. After cooling, excess saturated sodium carbonate solution is added dropwise to the stirred reaction mixture. The benzine phase is separated, washed with water, dried and evaporated to dryness. The residue is distilled in a high vacuum, yielding the aforesaid 5-acetyl-10-methyl-5H-dibenz[b,f]azepine.

The 10-methyl-5H-dibenz[b,f]azepine is prepared as follows:

(i) 407 parts of bromine in 250 parts by volume of chloroform are dropped into a solution of 600 parts of 5-acetyl-5H-dibenz[b,f]azepine in 1200 parts by volume of chloroform at 5–10° with stirring. The decolorized solution is then cooled to −10° while stirring, when crystallization of the 5-acetyl-10,11-dibromo-10,11-dihydro-5H-dibenz[b,f]azepine takes place. It is filtered off by suction and dried in vacuo. M.P. 136–138°.

(ii) 125 parts of 5-acetyl-10,11-dibromo-10,11-dihydro-5H-dibenz[b,f]azepine are introduced with vigorous stirring into a solution of 135 parts of sodium in 1000 parts by volume of distilled methanol and the solution is then boiled under reflux for 16 hours. 500 parts by volume of methanol are then distilled off and the reaction solution is boiled under reflux for a further 24 hours. After cooling, 500 parts of water are slowly added, when the crystalline crude product is precipitated. It is filtered off by suction, thoroughly washed with water and dried in vacuo at 60°. 10-methoxy-5H-dibenz[b,f]azepine of M.P. 124° is obtained by recrystallization from 350 parts by volume of absolute alcohol.

(iii) 268 parts of 10-methoxy-5H-dibenz[b,f]azepine and 192 parts of benzyl chloride are dissolved in 1340 parts of absolute benzene. A suspension of 62 parts of sodamide in toluene is dropped in at 50–55° with vigorous stirring in a period of 2 hours. The reaction mixture is thereupon stirred for a further hour at this temperature, and then boiled under reflux for an hour. After cooling, it is treated with water and the benzene layer is separated. The aqueous phase is extracted with benzene, and the combined benzene solutions are dried and evaporated. On addition of ether to the residue, 5-benzyl-10-methoxy-5H-dibenz[b,f]azepine crystallizes out. M.P. 121°.

(iv) 318 parts of the product from (iii) are boiled for an hour with 1000 parts of 2 N-hydrochloric acid with stirring. At 95° the substance melts to an oil, which however soon solidifies during the boiling. After cooling, the separated crystals are filtered off by suction and washed with water until neutral. After drying, they are recrystallized from benzene, when 5-benzyl-5H-dibenz[b,f]azepine-10(11H)-one of melting point 152° is obtained.

(v) 75 parts of 5-benzyl-5H-dibenz[b,f]azepine-10(11H)-one in 250 parts by volume of benzene are added dropwise at 0° to a Grignard solution consisting of 12.5 parts of magnesium and 78 parts of methyl iodide in 150 parts by volume of absolute ether, and the reaction mixture is then stirred for 36 hours at room temperature. It is thereupon poured on ice and dilute hydrochloric acid, the separated oil is taken up in ether and the ether solution is thoroughly washed with water, dried and evaporated. 5-benzyl-10-methyl-10-hydroxy-10,11-dihydro-5H-dibenz[b,f]azepine remains, which without further purification is boiled with 320 parts of 2 N-hydrochloric acid with stirring. Purification of the product can be effected by extraction with ether, conversion of the residue after distilling of the ether into the hydrobromide (by means of hydrobromic acid), and liberation of the base from hydrobromide by means of aqueous ammonia.

(b) To a solution of 50 g. of dimethylamine in 150 ml. of absolute ethanol is added 70 g. of 5-acetyl-10-bromomethyl-5H- dibenz[b,f]azepine in such a manner that the exothermal reaction is kept under control, and the temperature in reaction mixture does not exceed 50° C. After completion of the reaction the solution is evaporated to dryness. The residue is distributed between 200 ml. concentrated sodium hydroxide solution and excess ether, the ether phase is dried and concentrated, which results in crystallization of 5-acetyl-10-dimethylaminomethyl-5H-dibenz[b,f]azepine, M.P. 108–109°, yield 80%.

(c) 17 g. of 5-acetyl-10-dimethylaminomethyl-5H-dibenz[b,f]azepine in 85 ml. of 20% absolute ethanolic potassium hydroxide solution are refluxed for 16 hours. Subsequently, the mixture is poured into water (about 1000 ml.) and the crystalline precipitate filtered off. After drying and recrystallization from benzine there is obtained 10 - dimethylaminomethyl - 5H-dibenz[b,f]azepine, M.P. 127–128°, yield 87%.

In the analogous manner there is obtained, from the corresponding starting materials (XXIV) and the appropriate amines:

10-methylaminomethyl-5H-dibenz[b,f]azepine,
10-piperidinomethyl-5H-dibenz[b,f]azepine,
10-pyrrolidinomethyl-5H-dibenz[b,f]azepine,
10-diethylaminomethyl-5H-dibenz[b,f]azepine,
10-[4′-(2″-hydroxyethyl)-1″-piperazinyl]methyl-5-H-dibenz[b,f]azepine,
10-(4′-methyl-1′-piperazinyl)-methyl-5H-dibenz[b,f]azepine
3-chloro-10-dimethylamino-methyl-5H-dibenz[b,f]azepine Starting from 5-acetyl-10-ethyl-5H-dibenz[b,f]azepine and performing steps (a) to (c) above, there is obtained after step (a): 5-acetyl-10-(1′-bromoethyl) - 5H - dibenz[b,f]azepine, after step (b): 5-acetyl-10-(1′-substituted amino)ethyl-5H-dibenz[b,f]azepine, and after step (c): the corresponding 10-(1′-substituted amino)ethyl-5H-dibenz[b,f]azepines. Thus there is obtained, after step (c), when using in step (b): 1-(2′-hydroxyethyl)-piperazine: 10-1′[4″-(2″-hydroxyethyl)-1″-piperazinyl] - ethyl - 5H-dibenz[b,f]azepine, pyrrolidine: 10-(1′-pyrrolidinoethyl)-5H-dibenz[b,f]azepine, dimethyl: 10-(1′-dimethylaminoethyl)-5H-dibenz[b,f]azepine, and diethylamine: 10-(1′-diethylaminoethyl)-5H-dibenz[b,f]azepine.

EXAMPLE 5

(a) A solution of 80 g. of sodium cyanide in 30 ml. water is added dropwise, at about 40°, to a solution of 90 g. 5-acetyl-10-bromomethyl-5H-dibenz[b,f]azepine in 900 ml. absolute ethanol, and the mixture is kept at this temperature for 20 hours. Subsequently, the solvents are stripped off in vacuo and the residue is crystallized from ethyl acetate/ether giving 5-acetyl-10-cyanomethyl-5H-dibenz[b,f]azepine, M.P. 137–138°, yield 80%.

(b) The mixture of 60 g. 5-acetyl-10-cyanomethyl-5H-dibenz[b,f]azepine, 430 ml. ethanol and 111.5 g. 50% aqueous potassium hydroxide is refluxed for 16 hours. Subsequently, the ethanol is stripped off in vacuo and the aqueous residue acidified with 30% sulfuric acid. 10-5H-dibenz[b,f]azepinylacetic acid precipitates, is filtered off and recrystallized from 80% ethanol, M.P. 167°, yield 90%.

(c) To a solution of 10 g. 10-5H-dibenz[b,f]azepinylacetic acid and 5.6 g. p-nitrophenol in dry ethyl acetate is added, in small portions, 8.2 g. of dicyclohexylcarbodiimide. The solution is then stirred for 20 hours and filtered. The filtrate is evaporated to dryness and the residue crystallized from benzene, giving p-nitrophenyl 10-5H-dibenz[b,f]azepinylacetate, M.P. 124–127°, yield 92%.

(d) To a solution of 37.2 g. of the p-nitrophenyl acetate obtained under (c) in 200 ml. chloroform there is added dropwise, at 5–10°, a solution of 10 g. dimethylamine in 50 ml. chloroform. Subsequently, the mixture is stirred for 1 hour at 35–40°. Thereupon the chloroform solution is washed with water, dried and evaporated to dryness. The residue is crystallized from ether giving N,N-dimethyl - (10 - 5H - dibenz[b,f]azepinylacetamide, M.P. 196–198°, yield 95%.

(e) To the stirred solution of 4.94 g. lithium aluminium hydride in 75 ml. tetrahydrofuran there is added dropwise a solution of 21.5 g. of the amide obtained under (d), and, subsequently, the temperature is kept for 16 hours at 50°. After cooling to about −10° the calculated amount of water is added, and the solvents are stripped off in vacuo. The residue is extracted with ether, and the basic material contained in the ether extract is then extracted into 2 N aqueous hydrochloric acid. The acid aqueous solution is basified and then extracted with ether. The ether solution is dried and the calculated amount of fumaric acid added, whereupon the fumarate of 10-(2′-dimethylaminoethyl)-5H-dibenz[b,f]azepine, M.P. 200–204°, separates and is filtered off, yield 80%.

In an analogous manner there has been prepared:

10-(2'-diethylaminoethyl)-5H-dibenz[b,f]azepine,
10-(2'-piperidinoethyl)-5H-dibenz[b,f]azepine fumarate,
10-[2'-(4''-methyl-1''-piperazinyl)ethyl]-5H-dibenz[b,f]azepine difumarate.

EXAMPLE 6

(a) To 164 g. ethyl cyanoacetate there is added, at 0–5°, a solution of 34 g. sodium in 600 ml. absolute ethanol. To this solution is added dropwise, at 0–5°, a solution of 124 g. of 5-acetyl-10-bromomethyl-5H-dibenz[b,f]azepine in 250 ml. ethanol. The solution is stirred for 2 hours at 0–5° and subsequently for 14 hours at room temperature. Then the temperature is lowered to 0° and 67 ml. glacial acetic acid are added so that the solution becomes weakly acidic. Then the solvents are stripped off in vacuo and the oily residue is poured on ice. Water is added, the mixture extracted with ether, the ether phase dried and the solvent removed in vacuo. The oily residue consists of 125 g. of ethyl α-cyano-β-(5'-acetyl-10-5H-dibenz[b,f]azepinyl)-propionate.

(b) The ester obtained under (a) (125 g.) is saponified with 1000 ml. 2 N sodium hydroxide solution on the steambath for 30 minutes. The clear solution is acidified with concentrated hydrochloric acid and the precipitated acid extracted into ethyl acetate. After drying the ethyl acetate extract, the solvent is removed in vacuo, and the crude, amorphous acid so obtained is heated for 1 hour to 180° (bath temperature) when decarboxylation is essentially complete. The residue consists of 87 g. 5-acetyl-10-(2'-cyanoethyl)-5H-dibenz[b,f]azepine. This nitrile is dissolved in 500 ml. ethanol, 220 g. 50% potassium hydroxide solution are added, and the whole is refluxed for 2 hours. After cooling, the mixture is poured on ice and the clear solution acidified with concentrated hydrochloric acid. The precipitate is collected, dried, and crystallized from ethyl acetate giving β-(5'-acetyl-10'-5H-dibenz[b,f]azepinyl)propionic acid, M.P. 169–170°. Saponification of 2 g. of this material by refluxing it for 16 hours in 8 ml. ethanol containing 2 g. potassium hydroxide affords β-(10'-5H-dibenz[b,f]azepinyl)propionic acid, M.P. 193–195°.

By using, in step (a), dimethyl malonate instead of ethyl cyanoacetate, there is obtained dimethyl (5'-acetyl-10'-5H-dibenz[b,f]azepinyl)methyl-malonate, which, after refluxing for 12 hours in aqueous-methanolic (1:1) 4 N hydrochloric acid solution affords β-(5'-acetyl-10'-5H-dibenz[b,f]azepinyl)-propionic acid, which, when heated in diethylene glycol with 3 equivalents of potassium hydroxide to 150–160° for 6 hours furnishes β-(10'-5H-dibenz[b,f]azepinyl)-propionic acid.

(c) 30 g. β-(10'-5H-dibenz[b,f]azepinyl)-propionic acid and 16 g. p-nitrophenol are dissolved in 600 ml. ethyl acetate. To this solution, which is stirred, there is added, in portions, 23 g. of dicyclohexylcarbodiimide. After 16 hours the precipitate is filtered off, and the filtrate is evaporated to dryness. 16 g. of the remaining residue are dissolved in 120 ml. chloroform and to this solution 7 g. of dimethylamine are added at room temperature. Subsequently, the mixture is stirred for 3 hours at 35°. Thereafter, the solution is washed with water, the chloroform phase dried, and evaporated to dryness. The residue is crystallized from ethanol, giving N,N-dimethyl-β-(10'-5H-dibenz[b,f]azepinyl)-propionamide, M.P. 187–180°.

(d) 9 g. of the propionamide obtained under (c) is reduced with 2.2 g. lithium aluminum hydride in 275 ml. tetrahydrofuran and worked up according to the procedure given in Example 18 (e), thus furnishing 10-(3'-dimethylaminopropyl)-5H-dibenz[b,f]azepine, B.P. 162–163°/0.001 torr. In an analogous manner there is prepared, using diethyl methylmalonate in step (a) above, and carrying out steps (a) to (c):

10-(3'-dimethylamino-2'-methyl-1'-propyl)-5H-dibenz[b,f]azepine, and
10-(3'-pyrrolidino-2'-methyl-1'-propyl)-5H-dibenz[b,f]azepine.

EXAMPLE 7

(a) 15 g. of 5-methyl-10-bromomethyl-5H-dibenz[b,f]azepine are dissolved in 50 ml. of abs. benzene and the solution is added to a solution of 10 g. of dimethylamine in 100 ml. of abs. benzene. The reaction mixture is then stirred for 1 hour at 40–50° whereupon the organic phase is washed well with water and extracted with 2 N hydrochloric acid. The acid extracts are made phenolphthalein alkaline with concentrated aqueous ammonia and shaken with diethyl ether. The ethereal solution is washed with water, dried over potassium carbonate and evaporated in vacuo. The residue, which is boiled under high vacuum, boils at 140–144°/0.01 torr. The free base obtained, 5-methyl-10-dimethylaminomethyl-5H-dibenz[b,f]azepine, is converted into the hydrochloride with abs. ethanolic hydrochloric acid; M.P. 225–228° from abs. ethanol.

The starting material, 5-methyl-10-bromomethyl-5H-dibenz[b,f]azepine, is produced as follows:

(b) 37.5 g. of 5,10-dimethyl-5H-dibenz[b,f]azepine are dissolved in 375 ml. of carbon tetrachloride and 30.5 g. of bromosuccinimide are added all at once. The reaction mixture is heated to 70° while stirring and exposed to two 200 watt lamps. The temperature is kept for 3–5 minutes at 70° by slight cooling. The reaction mixture is then cooled to 20°, the succinimide is drawn off under suction and washed with carbon tetrachloride. The filtrate is extracted with water, the organic phase is dried over sodium sulphate and concentrated in vacuo at 40°. The residue is recrystallised from cyclohexane whereupon the compound obtained melts at 109–111°.

EXAMPLE 8

The following compounds are obtained analogously to Example 7(a) from 5-methyl-10-bromomethyl-5H-dibenz[b,f]azepine:

(a) with methylamine, 5-methyl-10-methylaminomethyl-5H-dibenz[b,f]azepine, B.P. 147–149°/0.09 torr; hydrochloride M.P. 175–177° (from abs. ethanol/diethyl ether);

(b) with piperazine-1-ethanol, 4-(5-methyl-5H-dibenz[b,f]azepin-10-ylmethyl)piperazine-1-ethanol; M.P. of dihydrochloride 214–217° (from abs. methanol/diethyl ether);

(c) with diethylamine, 5-methyl-10-diethylaminomethyl-5H-dibenz[b,f]azepine, B.P. 147–150°/0.04 torr; fumarate M.P. 148–149° (from abs. ethanol);

(d) with 4-methyl-piperazine, 5-methyl-10-(4-methyl-1-piperazinylmethyl)-5H-dibenz[b,f]azepine (crude product); dihydrochloride M.P. 224–229° (from ethanol, with decomposition);

(e) with 1-(2-acetoxy-ethyl)-piperazine, 1-(2-acetoxyethyl)-4-(5-methyl-5H-dibenz[b,f]azepin-10-ylmethyl)-piperazine.

EXAMPLE 9

(a) The following end products are produced analogously to Example 7(a) from 5-ethyl-10-bromomethyl-5H-dibenz[b,f]azepine:

(a¹) with dimethylamine, 5-ethyl-10-(dimethylaminomethyl)-5H-dibenz[b,f]azepine, B.P. 150–152°/0.04 torr; hydrochloride M.P. 247–249° (from abs. ethanol);

(a²) with pyrrolidine, 5-ethyl-10-(1-pyrrolidinylmethyl)-5H-dibenz[b,f]azepine, M.P. 92° (from pentane); hydrochloride M.P. 170–172° (from abs. ethanol);

(b) The necessary compound, 5-ethyl-10-bromomethyl-5H-dibenz[b,f]azepine (crude product) is produced analogously to 5-methyl-10-bromomethyl-5H-dibenz[b,f]azepine described in Example 1, starting from 5-ethyl-10-methyl-5H-dibenz[b,f]azepine, M.P. 143–145° (from ethanol). Analogously to 5,10-dimethyl-5H-dibenz[b,f]azepine described in the literature, the 5-ethyl-10-methyl-5H-dibenz[b,f]azepine is produced starting from 10-methoxy-5H-dibenz[b,f]azepine, M.P. 124°, by way of the following intermediate products:

5-ethyl-10-methoxy-5H-dibenz[b,f]azepine, M.P. 186–188° (from ethanol),
5-ethyl-5H-dibenz[b,f]azepine-10(11H)-one, M.P. 126–128° (from ethanol),
5-ethyl-10-methyl-10,11-dihydro-5H-dibenz[b,f]azepin-10-ol (crude product).

EXAMPLE 10

A suspension of 13.8 g. of sodium amide in 30 ml. of abs. toluene is added dropwise within 15 minutes to 72 g. of 10-dimethylaminomethyl-5H-dibenz[b,f]azepine in 720 ml. of abs. toluene while stirring and the reaction mixture is then refluxed for 1 hour. It is cooled to 50° and, within 90 minutes, 45 g. of methyl iodide are added dropwise while maintaining a temperature of 50–52°. The reaction mixture is then stirred, first for 16 hours at between 50 and 52° and then for 1 hour at between 85 and 95° whereupon it is cooled to 20°. 100 ml. of water are added, the organic phase is separated and extracted with 2 N hydrochloric acid. The free base is precipitated from the hydrochloric acid extract with concentrated sodium hydroxide solution and it is extracted with diethyl ether. The ethereal solution is washed with water, dried over potassium carbonate and concentrated in vacuo. Distillation of the residue under high vacuum yields 5-methyl-10-dimethyl-aminomethyl-5H-dibenz[b,f]azepine which boils at 140–144°/0.01 torr. The free base is converted with ethanolic hydrochloric acid into the hydrochloride which, when recrystallised from abs. ethanol, melts at 225–228°.

EXAMPLE 11

The following compounds are obtained analogously to example 10:

(a) 5-methyl-10-(1 - pyrrolidinylmethyl) - 5H - dibenz[b,f]azepine, B.P. 160–164°/0.01 torr, from 10-(1-pyrrolidinylmethyl)-5H-dibenz[b,f]azepine and methyl iodide. The hydrochloride melts at 130–132° (from isopropanol).

(b) 5-methyl - 10 - piperidinomethyl - 5H - dibenz[b,f]azepine, B.P. 172–175°/0.01 Torr, from 10-piperidinomethyl-5H-dibenz[b,f]azepine with methyl iodide. The hydrochloride melts at 171–174° (from isopropanol).

(c) 5-methyl-10-(α-dimethylaminoethyl) - 5H - dibenz[b,f]azepine B.P. 145–149°/0.04 torr, from 10-(α-dimethylaminoethyl)-5H-dibenz[b,f]azepine with methyl iodide. The hydrochloride melts at 156–160° (from abs. ethanol/diethyl ether), and (d) 5-methyl-10-[α(1-pyrrolidinyl)-ethyl]-5H - dibenz[b,f]azepine B.P. 168–172°/0.3 torr from 10-[α-(1-pyrrolidinyl)-ethyl]-5H-dibenz[b,f]azepine with methyl iodide. The hydrochloride melts at 193–196° (from abs. ethanol).

EXAMPLE 12

(a) 15 g. of crude 5-methyl-10-(1-piperazinylmethyl)-5H-dibenz[b,f]azepine dissolved in 150 ml. of toluene are refluxed for 4 hours with 70 g. of potassium carbonate and 12.5 g. of β-bromoethanol. 100 ml. of water are then added to the cooled reaction mixture, the organic phase is removed and is extracted with 2 N hydrochloric acid. The hydrochloric acid extract is made alkaline with 4 N sodium hydroxide solution whereupon the crude base precipitates. It is taken up in ether, the ether solution is washed with water, dried over potassium carbonate and concentrated. Ethanolic hydrochloric acid is added to the concentrated solution until the pH is 4–5 whereupon the 4-(5-methyl-5H-dibenz[b,f]azepin-10-ylmethyl) - piperazine-1-ethanol dihydrochloride precipitates. It melts at 214–217° (from methanol/abs. ether).

The starting material, 5-methyl - 10 - (1 - piperazinylmethyl)-5H-dibenz[b,f]azepine, can be produced analogously to Example 7(a) or as follows:

(b) 17.0 g. of piperazine-1-carboxylic acid ethyl ester are dissolved while stirring in 100 ml. of abs. benzene. 15 g. of 5-methyl-10-bromomethyl-5H-dibenz[b,f]azepine in 75 ml. of abs. benzene are added dropwise to this solution and the mixture is refluxed for 1 hour. It is then cooled, the organic phase is washed with water, dried over potassium carbonate and concentrated in vacuo.

18 g. of the residue, 4-(5-methyl-5H-dibenz[b,f]azepin-10-ylmethyl)-piperazine-1-carboxylic acid ethyl ester and a solution of 18 g. of potassium hydroxide in 72 ml. of abs. ethanol are refluxed for 8 hours. The cooled reaction mixture is then poured into water and taken up in ether. The ether solution is extracted with 2 N hydrochloric acid and the acid extract is made phenolphthalein alkaline with concentrated ammonia. The precipitated crude base is taken up in ether, the ether solution is washed with water, dried over potassium carbonate and concentrated. Crude 5-methyl-10-(1-piperazinyl-methyl) - 5H - dibenz[b,f]azepine is obtained which, in acetone solution with ethanolic hydrochloric acid, yields the dihydrochloride. The latter melts at 184–189° (from ethanol).

EXAMPLE 13

7 g. of ethylene oxide are introduced into a solution of 5-methyl-10-(1-piperazinylmethyl) - 5H - dibenz[b,f]azepine in 250 ml. of ethanol and the mixture is refluxed for 2 hours. The cooled reaction mixture is concentrated in vacuo and the calculated amount of methanolic hydrochloric acid is added to the residue whereupon 4-(5-methyl-5H-dibenz[b,f]azepin-10-ylmethyl) - piperazine-1-ethanol dihydrochloride precipitates. It melts at 214–217° (from methanol/absolute ether).

The starting material, 5-methyl - 10 - (1-piperazinylmethyl)-5H-dibenz[b,f]azepine, is produced according to Example 12(b).

EXAMPLE 14

33.6 g. of 4-(5-methyl - 5H - dibenz[b,f]azepin - 10-ylmethyl)-piperazine-1-ethanol and 101 g. of acetic acid anhydride are refluxed for 3 hours. The excess acetic acid anhydride is then distilled off in vacuo and concentrated ammonia is added to the residue. The base which precipitates is extracted with diethyl ether, the ethereal solution is washed with water, dried over sodium sulphate and concentrated in vacuo. The residue is dissolved in acetone and neutralised with abs. ethanolic hydrochloric acid, whereupon 1-(2-acetoxyethyl)-4-(5-methyl - 5H - dibenz[b,f]azepin-10-ylmethyl)-piperazine dihydrochloride crystallises out.

We claim:

1. A compound selected from among an azepine derivative of the formula

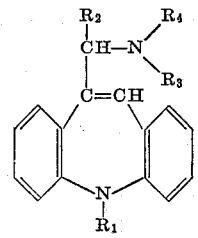

wherein
$R_1$ represents hydrogen or lower alkyl,
$R_2$ represents hydrogen or methyl,
each of $R_3$ and $R_4$ represents hydrogen or lower alkyl or

represents pyrrolidino, piperidino, hexahydro 1H-azepino, piperazino, 4-methylpiperazino, 4-(2-hydroxyethyl)piperazino, 4-(2-acetoxyethyl)piperazino, 4-(2-pivalyoloxyethyl)piperazino, hexahydro - 1H - 1,4-diazepino, 4-methyl-hexahydro-1H-1,4-diazepino or 4-(2-hydroxyethyl)-hexahydro-1H-1,4-diazepino,
and a pharmaceutically acceptable addition salt of said derivative with an acid.

2. A compound as defined in claim 1, wherein $R_1$ represents hydrogen.

3. A compound as defined in claim 1, wherein $R_2$ represents methyl.

4. A compound as defined in claim 1, which is selected from among 5-ethyl-10-(dimethylaminomethyl)-5H-dibenz[b,f]azepine and the hydrochloride salt thereof.

5. A compound as defined in claim 1, which is selected from among 5-ethyl-10-(1-pyrrolidinylmethyl)-5H-dibenz[b,f]azepine and the hydrochloride salt thereof.

6. A compound of the formula

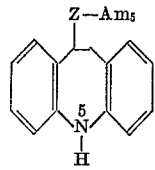

wherein
Z is alkylene with maximally 6 carbon atoms, and
$Am_5$ is a member selected from the group consisting of —N(lower alkyl)$_2$, —NH-lower alkyl, 1-pyrrolidyl, 1-piperidyl, 4-lower alkyl-1-piperazinyl and 4-(hydroxy-lower alkyl)-1-piperazinyl.

7. 10-(2'-dimethylaminoethyl) - 10,11 - dihydro - 5H-dibenz[b,f]azepine.

8. 10-(3'-methylamino-n-propyl) - 10,11 - dihydro-5H-dibenz[b,f]azepine.

9. 5 - methyl - 10 - (2' - dimethylaminoethyl) - 10,11-dihydro-5H-dibenz[b,f]azepine.

10. 5 - methyl - 10 - (3'-methylamino-n-propyl)-10,11-dihydro-5H-dibenz[b,f]azepine.

11. 5 - methyl - 10-(3'-dimethylamino-n-propyl)10,11-dihydro-5H-dibenz[b,f]azepine.

12. A compound of the formula

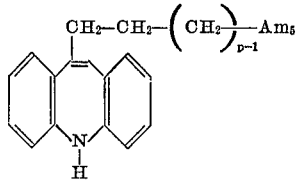

wherein $p$ is an integer ranging from 1 to 2, and $Am_5$ is a member selected from the group consisting of —N(lower alkyl)$_2$, —NH-lower alkyl, 1-pyrrolidyl, 1-piperidyl, 4-lower alkyl-1-piperazinyl and 4-(hydroxy-lower alkyl)-1-piperazinyl.

13. 10 - (2' - dimethylaminoethyl) - 5H - dibenz[b,f]azepine.

14. 10 - (3' - methylamino-n-propyl) - 5H-dibenz[b,f]azepine.

15. 10 - (3' - dimethylamino-n - propyl) - 5H - dibenz[b,f] azepine.

16. A compound of the formula

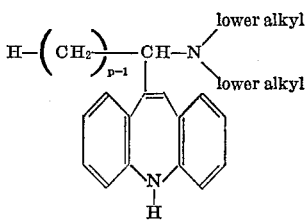

wherein $p$ is an integer ranging from 1 to 2.

17. 10-dimethylaminomethyl-5H-(dibenz[b,f]azepine.

18. 10-diethylaminomethyl-5H-dibenz[b,f]azepine.

19. 10-(1'dimethylaminoethyl)-5H-dibenz[b,f]azepine.

20. 10-(1'-diethylaminoethyl)-5H-dibenz[b,f]azepine.

21. A compound of the formula

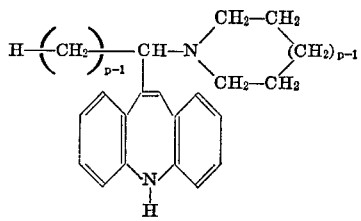

wherein $p$ is an integer ranging from 1 to 2.

22. 10-piperidinomethyl-5H-dibenz[b,f]azepine.
23. 10-pyrrolidinomethyl-5H-dibenz[b,f]azepine.
24. 10-(1'-piperidinoethyl)-5H-dibenz[b,f]azepine.
25. 10-(1'-pyrrolidinoethyl)-5H-dibenz[b,f]azepine.
26. A compound of the formula

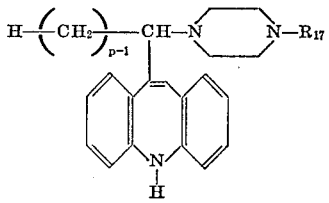

wherein $p$ is an integer ranging from 1 to 2, and
$R_{17}$ is a member selected from the group consisting of methyl and 2-hydroxy-ethyl.

27. 10 - [4'-methyl-piperazinyl-(1')]-methyl-5H-dibenz[b,f]azepine.

28. 10 - [4' - (2" - hydroxyethyl) - piperazinyl-(1')]-methyl-5H-dibenz[b,f]azepine.

29. A compound as defined in claim 1, wherein $R_1$ represents methyl.

30. A compound as defined in claim 29, which is 5-methyl-10-dimethylaminomethyl-5H - dibenz[b,f]azepine or a pharmaceutically acceptable salt thereof.

31. A compound as defined in claim 29, which is 5-methyl-10-methylaminomethyl-5H-dibenz[b,f]azepine or a pharmaceutically acceptable salt thereof.

32. A compound as defined in claim 29, which is 4-(5-methyl - 5H - dibenz[b,f]azepin-10-ylmethyl)-piperazine-1-ethanol or a pharmaceutically acceptable salt thereof.

33. A compound as defined in claim 29, which is 5-methyl - 10-(diethylaminomethyl)-5H-dibenz[b,f]azepine or a pharmaceutically acceptable salt thereof.

34. A compound as defined in claim 29, which is 5-methyl - 10 - (4-methyl-1-piperazinylmethyl)-5H-dibenz[b,f]azepine or a pharmaceutically acceptable salt thereof.

35. A compound as defined in claim 29, which is 5-methyl - 10-(1-pyrrolidinylmethyl)-5H-dibenz[b,f]azepine or a pharmaceutically acceptable salt thereof.

36. A compound as defined in claim 29, which is 5-methyl - 10-piperidinomethyl-5H-dibenz[b,f]azepine or a pharmaceutically acceptable salt thereof.

37. A compound as defined in ciaim 29, which is 5-methyl - 10 - (α - dimethylamino-ethyl)-5H-dibenz[b,f]azepine or a pharmaceutically acceptable salt thereof.

38. A compound as defined in claim 29, which is 5-methyl - 10 - [α - (1-pyrrolidinyl)-ethyl]-5H-dibenz[b,f]azepine or a pharmaceutically acceptable salt thereof.

39. A compound as defined in claim 6 which is 10-(3'- dimethylaminopropyl) - 10,11 - dihydro-5H-dibenz[b,f] azepine or a pharmaceutically acceptable salt thereof.

References Cited

UNITED STATES PATENTS 3,016,373   1/1962   Saggiomo et al. _____ 260—239

ALTON D. ROLLINS, Primary Examiner

U.S. Cl. X.R.

260—247.5, 268, 293, 309.7, 326.81; 424—244, 250, 267, 274

PO-1050
(5/69)

UNITED STATES PATENT OFFICE
CERTIFICATE OF CORRECTION

Patent No. 3,501,459      Dated March 17, 1970

Inventor(s) Walter Schindler, Hans Blattner

It is certified that error appears in the above-identified patent and that said Letters Patent are hereby corrected as shown below:

Col. 3, line 10 "XXXI-A" should be -- XXI-A --

Col. 3, line 14, "XI-C" should be -- XXI-C --

Col. 3, line 16, "are converted to the corresponding 10-mono" should be -- ester, which affords the corresponding 10-N --

Col. 3, line 40, after "chloride" and before "β" there should appear -- β-(N-carbo-methoxy-methylamino)-ethyl chloride --

Col. 3, line 42, after "chloride" and before "and" there should appear -- ν-(N-carboethoxy-methylamino)-propyl chloride --

Col. 7, first paragraph, lines 1-4 should be deleted.

Col. 12, Structure (XXX), "$HO_2$" should be -- $NO_2$ --

Col. 13, line 25, center of formula should have a double bond at positions 10 and 11.

Col. 16, line 71, Formula should be identified -- V --

Col. 20, line 60, after "azepinyl" and before "acetamide" there should be a closing parenthesis [)]

Col. 23, line 57, "0.3" should be -- 0.03 --

SIGNED AND
SEALED
SEP 15 1970

(SEAL)
Attest:

Edward M. Fletcher, Jr.
Attesting Officer

WILLIAM E. SCHUYLER, JR.
Commissioner of Patents